US012676355B2

(12) United States Patent
Kim et al.

(10) Patent No.: US 12,676,355 B2
(45) Date of Patent: *Jul. 7, 2026

(54) BATTERY PACK

(71) Applicant: LG Energy Solution, Ltd., Seoul (KR)

(72) Inventors: Kyung-Mo Kim, Daejeon (KR);
Ho-June Chi, Daejeon (KR); **Jeong-O
Mun, Daejeon (KR); Jin-Yong Park**,
Daejeon (KR); Jung-Hoon Lee,
Daejeon (KR)

(73) Assignee: LG Energy Solution, Ltd., Seoul (KR)

( * ) Notice: Subject to any disclaimer, the term of this
patent is extended or adjusted under 35
U.S.C. 154(b) by 6 days.

This patent is subject to a terminal dis-
claimer.

(21) Appl. No.: 18/762,149

(22) Filed: Jul. 2, 2024

(65) Prior Publication Data

US 2025/0038294 A1     Jan. 30, 2025

Related U.S. Application Data

(63) Continuation of application No. 18/402,170, filed on
Jan. 2, 2024, now Pat. No. 12,051,789, which is a
(Continued)

(30) Foreign Application Priority Data

Dec. 1, 2017     (KR) ........................ 10-2017-0164084

(51) Int. Cl.
*H01M 10/625* (2014.01)
*H01M 10/0525* (2010.01)
(Continued)

(52) U.S. Cl.
CPC ..... *H01M 10/625* (2015.04); *H01M 10/0525*
(2013.01); *H01M 10/613* (2015.04);
(Continued)

(58) Field of Classification Search
CPC ........... H01M 10/625; H01M 10/0525; H01M
10/613; H01M 10/6551; H01M 10/6553;
(Continued)

(56) References Cited

U.S. PATENT DOCUMENTS 10,637,110 B1     4/2020  Tsai et al.
11,362,391 B2 *   6/2022  Kim ................... H01M 10/613
(Continued)

FOREIGN PATENT DOCUMENTS

CN          101443950 A     5/2009
CN          101728596 A     6/2010
(Continued)

OTHER PUBLICATIONS

International Search Report from Application No. PCT/KR2018/
013741 mailed Feb. 18, 2019, 2 pages.
(Continued)

*Primary Examiner* — Jack Chiang
(74) *Attorney, Agent, or Firm* — Lerner David LLP

(57) ABSTRACT

Disclosed is a battery pack including a battery module
having a plurality of battery cells, and a heat dissipation
member provided in contact with a bus bar at a side surface
of the battery module where electrode leads of the battery
cells and the bus bar coupled to the electrode leads are
disposed.

20 Claims, 8 Drawing Sheets

Related U.S. Application Data continuation of application No. 17/714,592, filed on Apr. 6, 2022, now Pat. No. 11,870,046, which is a continuation of application No. 16/624,707, filed as application No. PCT/KR2018/013741 on Nov. 12, 2018, now Pat. No. 11,362,391.

(51) Int. Cl.

| | |
|---|---|
| *H01M 10/613* | (2014.01) |
| *H01M 10/655* | (2014.01) |
| *H01M 10/6553* | (2014.01) |
| *H01M 50/211* | (2021.01) |
| *H01M 50/50* | (2021.01) |
| *H01M 50/505* | (2021.01) |

(52) U.S. Cl.
CPC ..... *H01M 10/655* (2015.04); *H01M 10/6553* (2015.04); *H01M 50/211* (2021.01); *H01M 50/50* (2021.01); *H01M 50/505* (2021.01)

(58) Field of Classification Search
CPC ... H01M 50/211; H01M 50/50; H01M 50/505
See application file for complete search history.

(56) References Cited

U.S. PATENT DOCUMENTS

| | | | | |
|---|---|---|---|---|
| 11,870,046 | B2 * | 1/2024 | Kim | .................. H01M 10/613 |
| 12,051,789 | B2 * | 7/2024 | Kim | .................. H01M 50/505 |
| 2007/0259263 | A1 | 11/2007 | Shibuya et al. | |
| 2008/0157721 | A1 | 7/2008 | Kaneko et al. | |
| 2009/0317698 | A1 | 12/2009 | Murata | |
| 2010/0236854 | A1 | 9/2010 | Nakamura | |
| 2011/0020686 | A1 | 1/2011 | Yamamoto et al. | |
| 2011/0070474 | A1 | 3/2011 | Lee et al. | |
| 2012/0231314 | A1 | 9/2012 | Sohn | |
| 2014/0315051 | A1 | 10/2014 | Han et al. | |
| 2016/0064783 | A1 | 3/2016 | Chorian et al. | |
| 2018/0090798 | A1 | 3/2018 | Valencia, Jr. et al. | |
| 2018/0131035 | A1 | 5/2018 | Hojo et al. | |
| 2019/0074557 | A1 | 3/2019 | Shin et al. | |
| 2019/0335608 | A1 | 10/2019 | Song et al. | |
| 2020/0044227 | A1 | 2/2020 | Ryu et al. | |
| 2021/0296721 | A1 | 9/2021 | Omura et al. | |

FOREIGN PATENT DOCUMENTS

| | | | |
|---|---|---|---|
| CN | 102356504 | A | 2/2012 |
| CN | 106469839 | A | 3/2017 |
| JP | 2003331816 | A | 11/2003 |
| JP | 2009252652 | A | 10/2009 |
| JP | 2013229266 | A | 11/2013 |
| KR | 20100081942 | A | 7/2010 |
| KR | 20120050799 | A | 5/2012 |
| KR | 20120102343 | A | 9/2012 |
| KR | 20140125194 | A | 10/2014 |
| KR | 20140142770 | A | 12/2014 |
| KR | 20170019229 | A | 2/2017 |
| KR | 20170021122 | A | 2/2017 |
| KR | 20170034560 | A | 3/2017 |
| KR | 20170095052 | A | 8/2017 |
| WO | 2013157560 | A1 | 10/2013 |
| WO | 2017138704 | A1 | 8/2017 |
| WO | 2018096966 | A1 | 5/2018 |

OTHER PUBLICATIONS

Extended European Search Report including Written Opinion for EP18883132.5 issued Oct. 5, 2020; 9 pages.
Search Report dated Apr. 14, 2022 from the Office Action for Chinese Application No. 201880037079.1 issued Apr. 20, 2022, 3 pages.

* cited by examiner

BATTERY PACK

CROSS-REFERENCE TO RELATED APPLICATIONS

The present application is a continuation of U.S. patent application Ser. No. 18/402,170, filed on Jan. 2, 2024, which is a continuation of U.S. patent application Ser. No. 17/714, 592, filed on Apr. 6, 2022, which is a continuation of U.S. patent application Ser. No. 16/624,707, filed on Dec. 19, 2019, which is a national phase entry under 35 U.S.C. § 371 of International Application No. PCT/KR2018/013741 filed Nov. 12, 2018, which claims priority to Korean Patent Application No. 10-2017-0164084 filed on Dec. 1, 2017 in the Republic of Korea, the disclosures of which are incorporated herein by reference.

TECHNICAL FIELD

The present disclosure relates to a battery pack, and more particularly, to a battery pack capable of improving heat dissipation efficiency.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery may be prepared by applying the positive or negative electrode active material to a current collector made of aluminum or copper sheet, mesh, film, foil, or the like and then drying the same.

FIG. 1 is a schematic exploded perspective view showing a conventional battery pack, FIG. 2 is a schematic perspective view showing the conventional battery pack, and FIG. 3 is a schematic cross-sectioned view, taken along the line A-A' of FIG. 2.

Referring to FIGS. 1 to 3, a conventional battery pack 1 includes a battery module 2. In the battery module 2, based on FIG. 1, a thermal pad 4 and a heatsink 5 are sequentially coupled to a bottom portion 3 to emit heat generated from the battery module 2. However, a region of the battery cell where heat is generated most is an electrode lead or a bus bar 6 directly connected to the electrode lead, rather than a bottom surface of the battery cell. Thus, even though the thermal pad 4 and the heatsink 5 are coupled to the bottom portion 3 of the battery module 2 where battery cells are stacked, the heat dissipation efficiency is not high. In FIGS. 1 and 2, the reference sign 7 designates a lower tray.

Also, as in FIG. 3, the thermal pad 4 and the heatsink 5 are coupled to the bottom portion 3 of the battery module 2. Thus, the total height of the battery pack 1 accommodating the plurality of the battery modules 2 is increased as much as the thickness of the thermal pad 4 and the heatsink 5.

In addition, as in FIG. 1, the thermal pad 4 and the heatsink 5 are manufactured to have a size corresponding to the total size of the bottom portion 3 of the battery module 2. Thus, the thermal pad 4 and the heatsink 5 should have a large area, which increases the cost.

SUMMARY

Technical Problem

The present disclosure is directed to providing a battery pack, which may improve the heat dissipation efficiency through a structural change.

Also, the present disclosure is directed to providing a battery pack, which may have a reduced total thickness.

In addition, the present disclosure is directed to providing a battery pack, which may require a reduced cost to manufacture a heat dissipation member.

Technical Solution

In one aspect of the present disclosure, there is provided a battery pack, comprising: a battery module having a plurality of battery cells; and a heat dissipation member provided in contact with a bus bar at a side surface of the battery module where electrode leads of the plurality of battery cells and the bus bar coupled to the electrode leads are disposed Also, the battery module may include a plurality of battery modules, each battery module having a plurality of battery cells and a side surface where electrode leads of the plurality of battery cells and the bus bar coupled to the electrode leads are disposed. The plurality of battery modules may be provided in a single layer and arranged in at least one row or column.

In addition, the heat dissipation member may have a cavity formed therein whereby the plurality of battery modules are disposed in the cavity, and the heat dissipation member surrounds the side surface of each of the plurality of battery modules.

Also, the heat dissipation member may have a band shape to surround rims of the plurality of battery modules, and the heat dissipation member may be provided in contact with the bus bar.

In addition, the heat dissipation member may include: a thermal pad coupled to the bus bar at the side surface of the battery module, and a heatsink coupled to the thermal pad.

Also, the heat sink may be configured to form a flow path so that a fluid for cooling flows therethrough.

In addition, the heat dissipation member may have a height corresponding to a height of the side surface of the battery module.

Meanwhile, in another aspect of the present disclosure, there is also provided a vehicle, comprising the battery pack of any of the embodiments described herein.

In another aspect of the present disclosure, there is provided a heat dissipation apparatus for dissipating heat generated by a battery module having a plurality of cells. The heat dissipation apparatus includes a heat dissipation member provided in contact with a bus bar of the battery module at a side surface of the battery module where electrode leads of the plurality of battery cells and the bus bar coupled to the electrode leads are disposed.

Advantageous Effects

In the embodiments of the present disclosure, since the heat dissipation member is in direct or indirect contact with an electrode lead or a bus bar directly connected to the electrode lead where heat is emitted relatively greater, rather than to a bottom portion of the battery module where heat is emitted relatively smaller, it is possible to improve the heat dissipation efficiency.

Also, since the thermal pad and the heatsink are coupled to the side surface of the battery module, rather than to the bottom portion of the battery module, it is possible to reduce the total height of the battery pack.

In addition, since the heat dissipation member is coupled to the battery module only at the side surface, the total area of the heat dissipation member is decreased, thereby reducing the cost of manufacturing the heat dissipation member.

DESCRIPTION OF DRAWINGS

FIG. 5 is a perspective view showing the battery pack according to the first embodiment of the present disclosure.

FIG. 9 is a schematic perspective view showing that a heat dissipation member is coupled to a side surface of a battery module, at a battery pack according to the second embodiment of the present disclosure.

DETAILED DESCRIPTION

Figure 1:
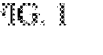
FIG. 1 is a schematic exploded perspective view showing a conventional battery pack.
Figure 2:
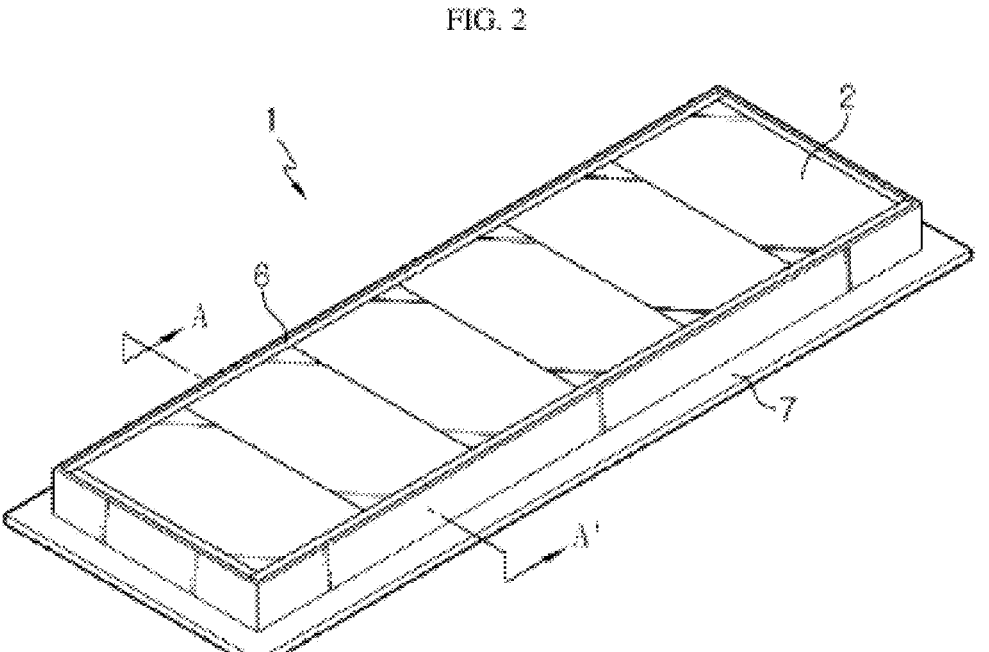
FIG. 2 is a schematic perspective view showing the conventional battery pack.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 4:
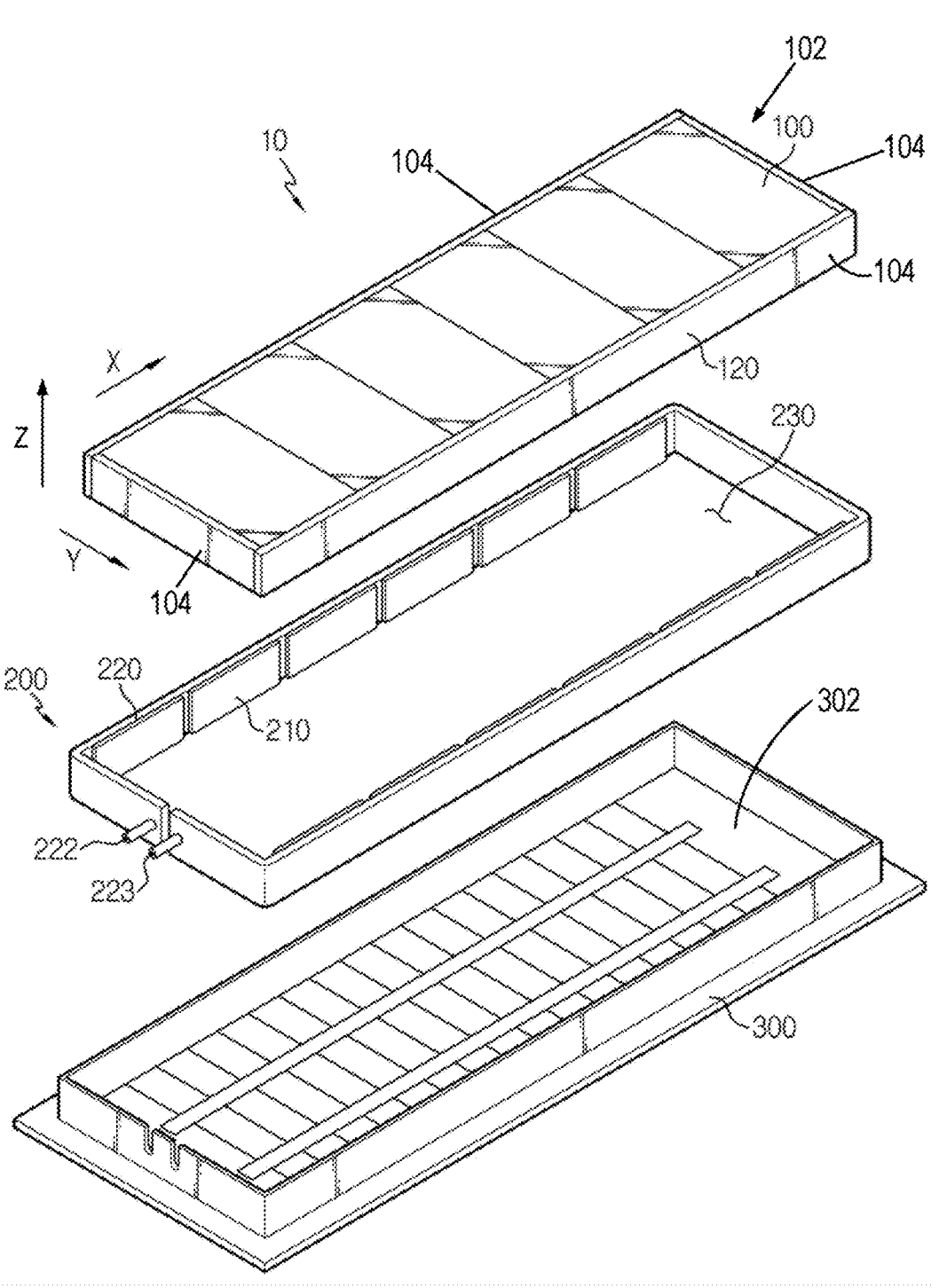
FIG. 4 is an exploded perspective view showing a battery pack according to the first embodiment of the present disclosure.
Figure 5:
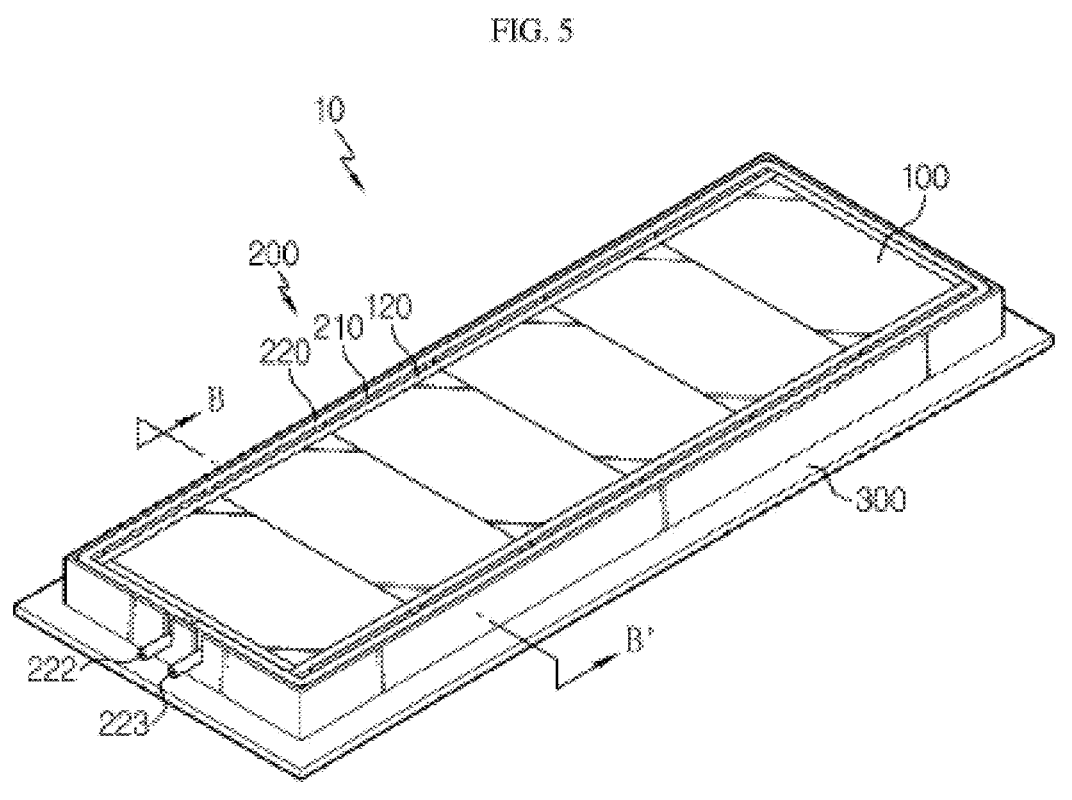
Figure 6:
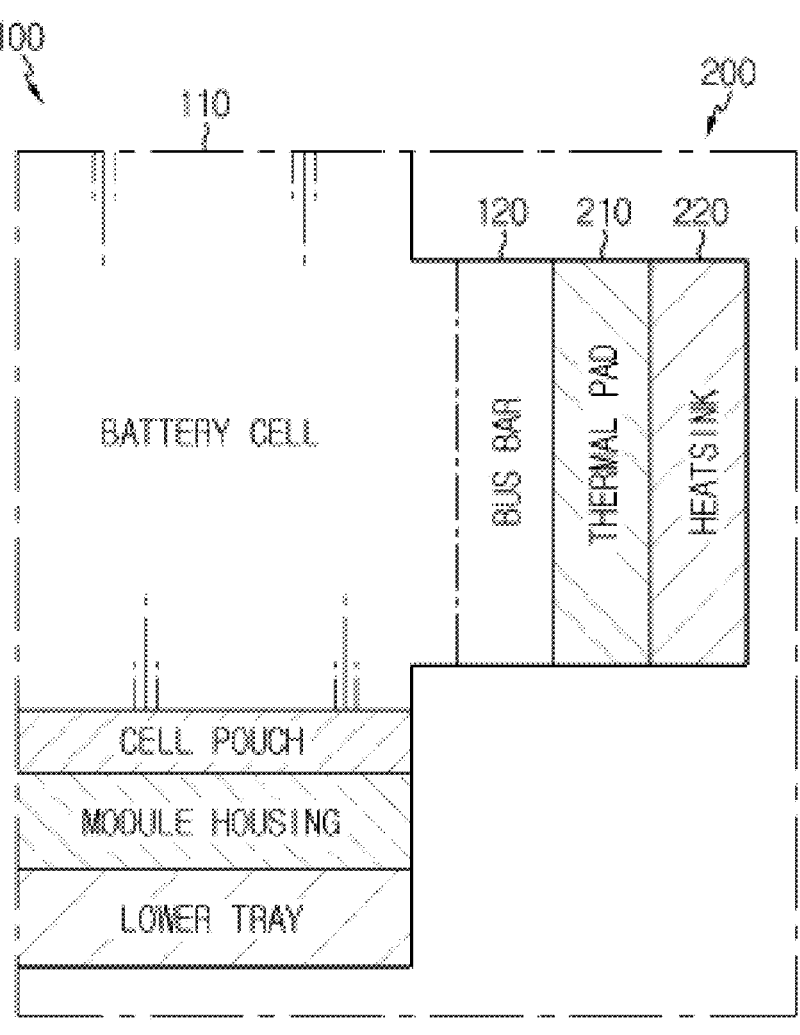
FIG. 6 is a schematic cross-sectioned view, taken along the line B-B' of FIG. 5.
Figure 7:
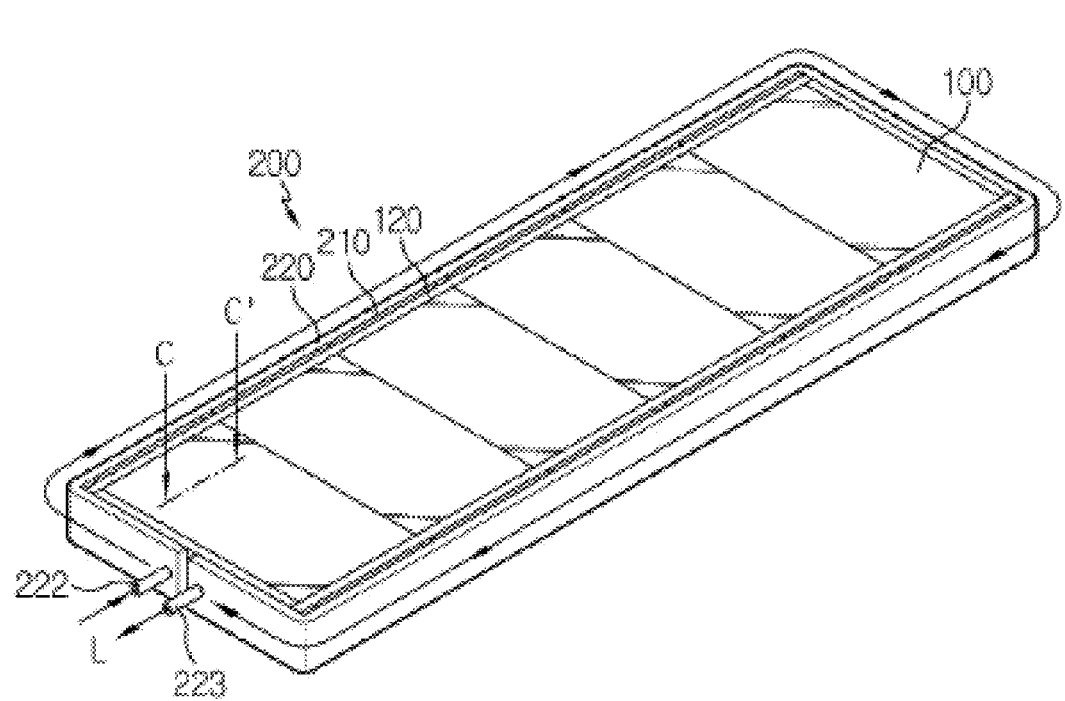
FIG. 7 is a schematic perspective view showing that a heat dissipation member is coupled to a side surface of a battery module, at the battery pack according to the first embodiment of the present disclosure.
Figure 8:
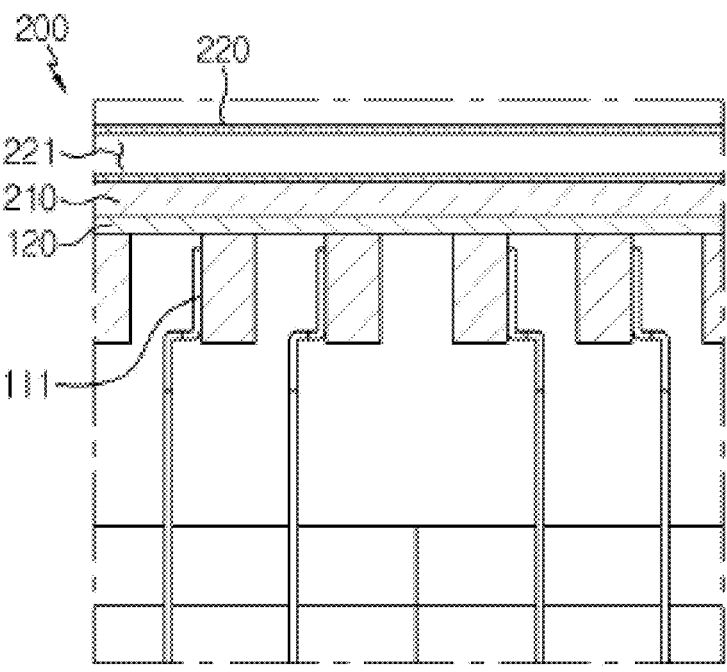
FIG. 8 is a schematic cross-sectioned view, taken along the line C-C' of FIG. 7.

FIG. 4 is an exploded perspective view showing a battery pack according to the first embodiment of the present disclosure, FIG. 5 is a perspective view showing the battery pack according to the first embodiment of the present disclosure, FIG. 6 is a schematic cross-sectioned view, taken along the line B-B' of FIG. 5, FIG. 7 is a schematic perspective view showing that a heat dissipation member is coupled to a side surface of a battery module, at the battery pack according to the first embodiment of the present disclosure, and FIG. 8 is a schematic cross-sectioned view, taken along the line C-C' of FIG. 7.

Referring to FIGS. 4 to 8, a battery pack 10 according to the first embodiment of the present disclosure includes a battery module 100 and a heat dissipation member 200. In FIGS. 4 and 5, the reference sign 300 designates a lower tray. The lower tray may include a lower surface 302.

In the battery pack 10, a plurality of battery modules 100 may be stacked or arranged in various ways. However, for convenience of explanation, it will be assumed that the plurality of battery modules 100 are provided in a single layer and arranged in at least one row or column. Here, the 'row' means the X direction based on FIG. 4 and may be referred to as a stacking axis along which the battery modules 100 are stacked, and the 'column' means the Y direction based on FIG. 4 and may be referred to as a width dimension. In the first embodiment, the battery modules 100 are arranged in a linear array 102 that may include one row and six columns of battery modules 100. If the plurality of battery modules 100 are provided in a single layer along a height dimension Z orthogonal to both the stacking axis X and the width dimension Y, as described above, the battery modules 100 may be easily disposed in a space with a limited height, such as an underfloor of an electric vehicle or the like. However, the use of the battery pack 10 according to the first embodiment of the present disclosure is not limited to a vehicle or the like.

The battery pack 10 may include an upper case (not shown) and a pack cover (not shown), and the upper case may be coupled to the pack cover to accommodate and protect the plurality of the battery modules 100. The upper case and the pack cover may accommodate one battery module 100 or a plurality of battery modules 100. That is, at least one battery module 100 is arranged inside the upper case and the pack cover so that the upper case and the pack cover surround and protect the battery module 100. Namely, the upper case and the pack cover entirely enclose the battery module 100, thereby protecting the battery module 100 against external vibration or shock. The upper case and the pack cover may be shaped corresponding to the shape of the battery module 100. For example, if the entire shape of the battery modules 100 arranged in a single layer is a hexahedron shape, the upper case and the pack cover may be provided in a hexahedron shape to correspond thereto. The upper case and the pack cover may be fabricated, for example, by bending a metal plate, and thus the upper case and the pack cover may be fabricated in an integrated form. Here, if the upper case and the pack cover are integrally fabricated, the coupling process may be performed in a simple and convenient way. Alternatively, the upper case and the pack cover may be fabricated separately and coupled together using various methods such as welding, riveting, bolt, bolting, pin coupling, bracketing, moment bonding or the like. In addition, the battery pack 10 may include various devices for controlling charge and discharge of the battery module 100, such as a battery management system (BMS), a current sensor, a fuse, and the like.

The battery module 100 includes a plurality of battery cells 110. The battery cell 110 may be configured so that a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity. In addition, the battery cell 110 (see FIG. 6) may include an electrode lead 111 (see FIG. 8). The electrode lead 111 is a kind of terminal exposed to the outside and connected to an external device and may be made of a conductive material. Here, the electrode lead 111 may be electrically coupled to a bus bar 120 (see FIG. 8). FIG. 4 schematically shows that the bus bar 120 is coupled to the electrode lead 111, and the bus bar 120 made of a conductive metal may have a frame function together. Alternatively, a frame made of a metal may be coupled to the bus bar 120 and the heat dissipation member 200 may be coupled to the frame such that the heat dissipation member 200 is indirectly coupled to the bus bar 120 by means of the frame. The electrode lead 111 may include a positive electrode lead and a negative electrode lead. The positive electrode lead and the negative electrode lead may be disposed at opposite sides of the battery cell 110 in the longitudinal direction, or the positive electrode lead and the negative electrode lead may be disposed at the same side the battery cell 110 in the longitudinal direction. Meanwhile, the battery module 100 may include a plurality of cartridges for accommodating the battery cells 110. Each cartridge may be fabricated by injection-molding plastic, and a plurality of cartridges having an accommodation portion for accommodating the battery cell 110 may be stacked. A cartridge assembly in which a plurality of cartridges are stacked may include a connector element or a terminal element. The connector element may include various types of electrical connecting components or connecting members for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside.

Referring to FIGS. 4, 5 and 7, the heat dissipation member 200 is in contact with the bus bar 120 provided to the battery module 100 at a side surface of the battery module 100. The side surface of the battery module 100 means a portion of the battery module 100, where the electrode lead 111 protrudes and is coupled to the bus bar 120, namely where the electrode lead 111 is coupled to the bus bar 120, when the battery module 100 is arranged as in FIG. 4.

As shown in FIG. 4, the heat dissipation member 200 may have a hollow 230 formed therein, and the battery modules 100 may be disposed in the hollow 230 of the heat dissipation member 200. Also, the heat dissipation member 200 having the hollow 230 may be formed to surround the side surfaces of the plurality of battery modules 100 (see FIGS. 5 and 7), where those side surfaces of the battery modules 100 in the linear array 102 collectively define a lateral surface 104 of the linear array 102, which extends in the height dimension Z orthogonally to the lower surface 302 of the lower tray 300. In addition, the heat dissipation member 200 may have a band shape as shown in FIG. 4, which wraps around a perimeter of the linear array 102 in the XY-plane. If the heat dissipation member 200 is formed in a band shape as described above, the heat dissipation member 200 contacts the bus bar 120 while surrounding the entire rim of the plurality of battery modules 100, and thus the heat generated from the battery cells 110 may be directly emitted by the heat dissipation member 200 through the electrode leads 111 and the bus bar 120.

The heat dissipation member 200 may include a thermal pad 210 and a heatsink 220. The thermal pad 210 may be coupled to the bus bar 120 at the side surfaces of the plurality of battery modules 100, and the heatsink 220 may be coupled to the thermal pad 210 (see FIG. 8). Due to the thermal pad 210 coupled to the bus bar 120 and the heatsink 220 coupled to the thermal pad 210, the heat generated within the battery cells 110 may be directly emitted through the bus bar 120.

The heat dissipation member 200 may have a height corresponding to the height of the side surface of the battery module 100. That is, the height of the side surface of the battery module 100 and the height of the bus bar 120 may be substantially the same, and the height of the heat dissipation member 200, namely the thermal pad 210 and the heatsink 220, may be substantially equal to the height of the bus bar 120. However, the present disclosure is not necessarily limited thereto, and an appropriate height may be selected as necessary.

The heatsink 220 of the heat dissipation member 200 may have a flow path 221 through which a fluid for cooling flows, as shown in FIG. 8. In addition, referring to FIG. 4, the heatsink 220 may have an inlet 222 through which the fluid flows in and an outlet 223 through which the fluid flows out. The fluid introduced through the inlet 222 flows along the flow path 221 formed at the heatsink 220 such that the fluid flows around the perimeter of the linear array 102 and is discharged out through the outlet 223 (see the arrow L in FIG. 7). While the fluid flows along the flow path 221, heat is transferred to the thermal pad 210 coupled to the heatsink 220.

Figure 3:
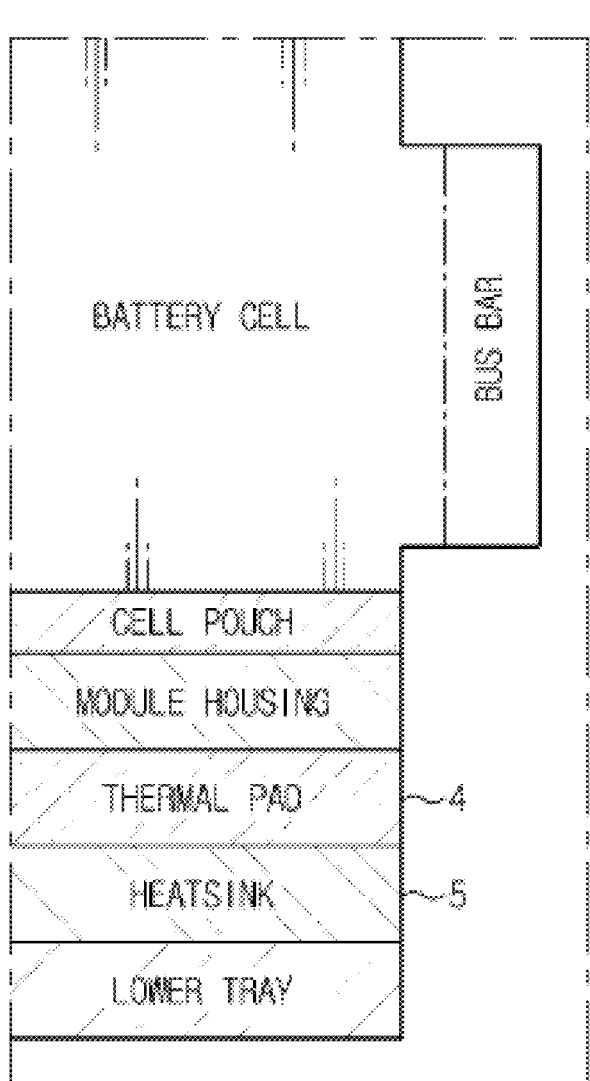
FIG. 3 is a schematic cross-sectioned view, taken along the line A-A' of FIG. 2.

As described above, the region of the battery cell 110 where heat is generated most is the electrode lead 111 or the bus bar 120 directly connected to the electrode lead 111, rather than the bottom surface of the battery cell 110. Thus, if the heat dissipation member 200 of the battery pack 10 according to the first embodiment of the present disclosure is coupled to the bus bar 120 at the side surfaces of the battery modules 100, the heat dissipation efficiency is greatly enhanced, compared to the conventional case where the heat dissipation member 200 is coupled to the bottom portion of the battery module 100. In addition, since the heat dissipation member 200 is formed in a band shape to contact only the side surface of the battery module 100, the area of the heat dissipation member 200 is significantly reduced compared to the conventional heat dissipation member 200 that contacts the entire bottom of the battery module 100, thereby reducing the manufacturing cost. Also, referring to FIG. 6, since the heat dissipation member 200 is not coupled to the bottom portion of the battery module 100 but is coupled to the side surface of the battery module 100, the overall height of the battery pack 10 may be reduced compared to the conventional case of FIG. 3.

Hereinafter, the operations and effects of the battery pack 10 according to the first embodiment of the present disclosure will be described.

The plurality of battery modules 100 may be provided in a single layer and arranged in at least one row or column. At this time, the electrode lead 111 of the battery cell 110 and the bus bar 120 coupled to the electrode lead 111 are disposed at the side surface of the battery module 100. The heat dissipation member 200 may include the thermal pad 210 and the heatsink 220. The heat dissipation member 200 may have the hollow 230 formed therein and be formed in a band shape to surround the side surfaces of the battery modules 100. In addition, the thermal pad 210 is in contact with each bus bar 120 located at the side surfaces of the battery modules 100, and the heatsink 220 is coupled to the thermal pad 210. The flow path 221 is formed inside the heatsink 220, and the fluid exchanges heat with the thermal pad 210 while moving along the flow path 221 inside the heatsink 220. As a result, the heat generated at the battery cell 110 may be emitted while moving to the thermal pad 210 and the heatsink 220 through the electrode lead 111 and the bus bar 120.

Figure 9:
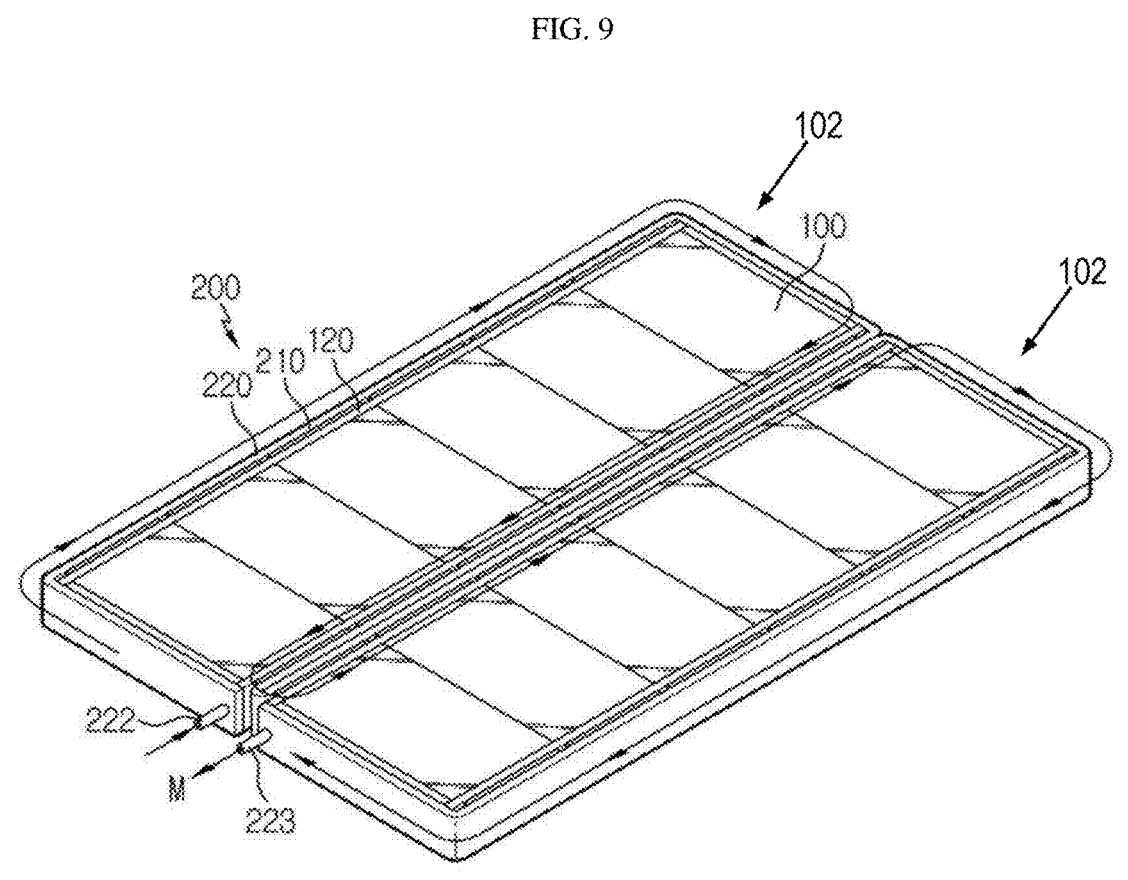

FIG. 9 is a schematic perspective view showing that a heat dissipation member is coupled to a side surface of a battery module 100, at a battery pack 10 according to the second embodiment of the present disclosure.

Hereinafter, the operations and effects of the battery pack 10 according to the second embodiment of the present disclosure will be described with reference to the accompanying drawings. Here, a feature already explained in relation to the battery pack 10 according to the first disclosure of the present disclosure will not be described in detail again.

In the second embodiment of the present disclosure, the battery modules 100 are arranged in a plurality of rows and a plurality of columns and coupled to the heat dissipation member 200, different from the first embodiment where the battery modules are arranged in one row and a plurality of columns.

That is, even though the battery modules 100 are arranged in a linear array 102 of one row and six columns in the first embodiment, in the second embodiment, the battery modules 100 are arranged in two parallel linear arrays 102 extending alongside one another so as to form two rows and six columns of battery modules 100. Meanwhile, the number of rows and columns of the battery modules 100 may be varied, and in some cases, one battery module 100 arranged in one row and one column may be included in one battery pack 100.

Referring to FIG. 9, the battery modules 100 are arranged in two rows and six columns. In addition, the heat dissipation member 200 may be bent between the battery module 100 in the first row and the battery module 100 in the second row to contact both the battery module 100 in the first row and the battery module 100 in the second row. Here, the fluid introduced through the inlet 222 flows along the flow path 221 formed in the heatsink 220 and is discharged out through the outlet 223 (see the arrow M in FIG. 9). Referring to FIG. 9, one heat dissipation member 200 is provided to surround both the battery module 100 in the first row and the battery module 100 in the second row. By doing so, the number of inlets 222 and outlets 223 may be reduced, compared to the case where two heat dissipation members 200 are provided to surround the battery module 100 in the first row and the battery module 100 in the second row individually. However, if necessary, two heat dissipation members 200 may be provided to surround the battery module 100 in the first row and the battery module 100 in the second row individually.

Meanwhile, a vehicle (not shown) according to an embodiment of the present disclosure may include the battery pack 10 described above, and the battery pack 10 may include the battery module 100. In addition, the battery pack 10 according to the first and second embodiments of the present disclosure may be applied to the vehicle (not shown), for example a vehicle using electricity such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery pack and is particularly applicable to an industry related to a secondary battery.

The invention claimed is:

1. A battery pack, comprising:
    a tray having a lower surface;
    a plurality of battery cells positioned in the tray and arranged in a linear array along a stacking axis extending parallel to the lower surface, the linear array having a width dimension and a height dimension orthogonal to one another and orthogonal to the stacking axis, the width dimension being parallel to the lower surface and the height dimension extending orthogonally to the lower surface, wherein a lateral surface of the linear array is defined by a side of the linear array extending in the height dimension and wrapping around a perimeter of the linear array in the height dimension; and
    a coolant channel extending along the lateral surface of the linear array, the coolant channel providing a flow-path configured to permit a cooling fluid to flow therethrough such that the cooling fluid encircles the linear array along the lateral surface.

2. The battery pack of claim 1, wherein the plurality of battery cells are grouped into a plurality of modules arranged along the stacking axis.

3. The battery pack of claim 2, wherein each of the plurality of modules includes a respective module housing.

4. The battery pack of claim 2, wherein the coolant channel is defined within a heatsink having a height extending along the height dimension that corresponds to a height of the plurality of modules along the height dimension.

5. The battery pack of claim 2, wherein the plurality of modules are arranged in a single layer along the stacking axis.

6. The battery pack of claim 1, further comprising a thermal pad positioned between the coolant channel and the lateral surface of the linear array.

7. The battery pack of claim 6, further comprising a bus bar positioned along the lateral surface of the linear array, the thermal pad being positioned between the coolant channel and the bus bar.

8. The battery pack of claim 1, further comprising a bus bar positioned along the lateral surface of the linear array.

9. The battery pack of claim 1, wherein electrode leads of the plurality of battery cells protrude from the lateral surface of the linear array.

10. The battery pack of claim 1, wherein the lateral surface of the linear array defines a rectangular shape along the lower surface of the tray, the rectangular shape having a front side, a rear side, a left side, and a right side, and wherein the coolant channel encircles the linear array by extending along the front side, the rear side, the left side, and the right side.

11. The battery pack of claim 1, wherein the plurality of battery cells are arranged in the linear array and a second linear array, the second linear array extending alongside and parallel to the linear array.

12. The battery pack of claim 11, wherein the coolant channel extends around the linear array and the second linear array.

13. The battery pack of claim 12, wherein the flowpath provided by the coolant channel includes a portion extending between the linear array and the second linear array.

14. The battery pack of claim 13, wherein the portion of the flowpath extending between the linear array and the second linear array includes a first portion and a second portion, the first portion extending along the linear array in a first direction parallel to the stacking axis, and the second portion extending along the second linear array in a second direction parallel to the stacking axis, the first direction being opposite to the second direction.

15. The battery pack of claim 12, wherein the coolant channel extending around the linear array and the second linear array communicates with a single inlet for introducing the cooling fluid and a single outlet for discharging the cooling fluid.

16. The battery pack of claim 11, wherein the coolant channel includes a portion extending between the linear array and the second linear array.

17. A vehicle comprising the battery pack of claim 1.

18. A battery pack, comprising:
a tray having a lower surface;
a plurality of battery cells positioned in the tray and arranged in a plurality of groups arrayed along respective axes, the plurality of groups including a first group arranged in a first linear array along a first axis and a second group arranged in a second linear array along a second axis, the first and second axes being parallel to one another and extending parallel to the lower surface, wherein each of the plurality of groups has a width dimension and a height dimension orthogonal to one another and orthogonal to the respective axis, the width dimension being parallel to the lower surface and the height dimension extending orthogonally to the lower surface, wherein a lateral surface of each of the plurality of groups is defined by a side of the respective group extending in the height dimension and wrapping around a perimeter of the respective group in the height dimension; and
a network of coolant channels defining respective flowpaths configured to permit a cooling fluid to flow therethrough so that the cooling fluid passes around the each of the plurality of groups, the network of coolant channels including a portion extending along the lateral surface of the first group and along the lateral surface of the second group, such that one of the flowpaths extends between the first and second groups.

19. The battery pack of claim 18, further comprising a first thermal pad and a second thermal pad, the first thermal pad positioned between a first one of the coolant channels and the lateral surface of the first group, and the second thermal pad positioned between a second one of the coolant channels and the lateral surface of the second group.

20. The battery pack of claim 18, further comprising a first bus bar and a second bus bar, the first bus bar positioned along the lateral surface of the first group, and the second bus bar positioned along the lateral surface of the second group.

* * * * *